United States Patent
Meissner et al.

(10) Patent No.: US 6,824,142 B2
(45) Date of Patent: Nov. 30, 2004

(54) METHOD OF ALIGNABLY SUPPORTING A WORK PIECE FOR ROTARY MOVEMENTS

(75) Inventors: Stephen C. Meissner, West Henrietta, NY (US); Randolph C. Brost, Albuquerque, NM (US)

(73) Assignee: Eastman Kodak Company, Rochester, NY (US)

( * ) Notice: Subject to any disclaimer, the term of this patent is extended or adjusted under 35 U.S.C. 154(b) by 56 days.

(21) Appl. No.: 10/320,868

(22) Filed: Dec. 17, 2002

(65) Prior Publication Data

US 2004/0113375 A1 Jun. 17, 2004

(51) Int. Cl.⁷ .............................................. B23B 31/36
(52) U.S. Cl. .............................. 279/133; 279/5; 279/6; 279/132; 82/151; 82/903
(58) Field of Search .............................. 279/5, 6, 126, 279/132, 133; 82/1.11, 170, 150, 151, 903

(56) References Cited

U.S. PATENT DOCUMENTS

| | | | |
|---|---|---|---|
| 2,276,945 A | * | 3/1942 | Ehrich ............................ 279/6 |
| 3,474,215 A | * | 10/1969 | Johanson .................. 219/69.15 |
| 3,474,691 A | * | 10/1969 | Levin et al. ................... 74/815 |
| 3,595,591 A | | 7/1971 | Koch |
| 3,599,996 A | | 8/1971 | Holt |
| 3,790,182 A | | 2/1974 | Schuman |
| 4,020,313 A | * | 4/1977 | Koga et al. ............... 219/69.15 |
| 4,108,024 A | * | 8/1978 | Ditzel et al. ............... 74/813 L |
| 4,209,180 A | | 6/1980 | Bertorello |
| 4,583,432 A | | 4/1986 | Bricker |
| 4,718,682 A | | 1/1988 | Zilic et al. |
| 5,882,015 A | | 3/1999 | McPherson |
| 6,375,398 B1 | | 4/2002 | Gaudreau et al. |
| 2004/0113376 A1 | * | 6/2004 | Meissner et al. ........... 279/132 |

FOREIGN PATENT DOCUMENTS

| | | |
|---|---|---|
| WO | WO 99/10785 | 3/1999 |
| WO | WO 99/42238 | 8/1999 |

* cited by examiner

*Primary Examiner*—Daniel W. Howell
*Assistant Examiner*—Luke Parsons
(74) *Attorney, Agent, or Firm*—Clyde E. Bailey, Sr.

(57) ABSTRACT

A method of alignably supporting an eccentric work piece for rotary movements uses a work piece holder that supports the work piece in alignment during rotary operations. A plurality of cooperating aligning members mounted along the rotary axis of a rotary unit, provides pivoting movements relative to the rotary axis while bearing the work piece. These pivoting movements of the aligning members enable the work piece to be aligned during rotary operations.

4 Claims, 7 Drawing Sheets

METHOD OF ALIGNABLY SUPPORTING A WORK PIECE FOR ROTARY MOVEMENTS

CROSS-REFERENCE TO RELATED APPLICATIONS

The present application is related to U.S. application Ser. No. 10/320,975, filed Dec. 12, 2002, by Stephen C. Meissner, et al., and entitled, "Eccentric Work Piece Holder And Method Of Making Same."

FIELD OF THE INVENTION

The invention relates generally to the field of work piece alignment, and in particular to work piece alignment on turning machines. More specifically, the invention relates to work piece alignment on turning machines to remove radial misalignment (runout) between the work piece and the rotary axis.

BACKGROUND OF THE INVENTION

In turning machines, such as lathes, ultra-precision grinders, and single point diamond turning machines, the work piece must be lined up exactly with the rotary axis to which it is attached. If the work piece is not aligned correctly at the beginning of the operation, precision and accuracy of the finished piece is compromised. The movements of the cutting tool are set precisely to coincide with the alignment of the rotary axis of the toolholder, and therefore, the work piece must be lined up exactly with the rotary axis of the toolholder for the machining operation to be successful.

Runout, characterized by uneven off-center motion, occurs when the alignment of the work piece is not present or not perfect. This results in machining errors on the work piece, and also adds more wear to the cutting tool. Since the motion is uneven, the edge of the tool is not worn evenly. Alignment must remain precise during the work operation.

Traditional removal of radial runout consists of mounting a work piece on either a vacuum or magnetic chuck, and tapping the work piece in the opposite direction of offset until radial runout is reduced to a satisfactory level as measured with an indicating device. Alignment in this traditional manner requires a high level of skill to achieve a reduction in radial runout efficiently. Relocation of the work piece by tapping it back and forth may result in adjustment overshoot and further misalignment in other directions, thus requiring additional alignment. These steps cost time and energy and often results in frustration There have been numerous prior art attempts to resolve the aforementioned problems. To solve the problem of runout, some devices depend on elaborate designs for both the toolholder and the work piece that are costly to manufacture. In other developments, the alignment may be adjusted by very complicated arrangements: pre-alignment bores and meshed tooth sets (PCT No. WO 99/42238 issued to Kevin J. Bisset on Aug. 26, 1999); jaws connected to drives with gear trains (U.S. Pat. No. 4,718,682 issued to Antun Zilic et al. on Jan. 12, 1988); jaws, motors, and a clutch (U.S. Pat. No. 4,209,180 issued to Mario Bertorello on Jun. 24, 1980); and piston and ball lock assemblies (U.S. Pat. No. 6,375,398 issued to Jack R. Gaudreau et al. on Apr. 23, 2002).

Other attempts to address this problem include devices that require a particular tool end working with a particular toolholder to secure the alignment. Most of them require a shank and collet with a cylindrical shaped housing to accept the tool end. Such devices are disclosed in: U.S. Pat. No. 3,790,182 issued to Robert H. Schuman on Feb. 5, 1974; U.S. Pat. No. 3,599,996 issued to Donald G. Holt on Aug. 17, 1971; U.S. Pat. No. 5,882,015 issued to Ronald L. McPherson on Mar. 16, 1999; and U.S. Pat. No. 6,375,398 issued to Jack R. Gaudreau et al. on Apr. 23, 2002. Misalignment and runout can be controlled only if the toolholder and tool ends are manufactured exactly as described in these patents. Different types of work pieces with different tool ends would not be acceptable.

The size of most of the devices cited in the aforementioned patents cannot be adjusted significantly. Because of the mechanisms built into the toolholder or the tool end, reducing the size of the device would be difficult if not impossible. (See, for example, the devices as depicted in U.S. Pat. No. 4,718,682 issued to Antun Zilic et al. and U.S. Pat. No. 4,209,180 issued to Mario Bertorello.) These devices cannot be made significantly smaller.

Skilled artisans will appreciate that there are other devices made for specialized purposes and, although effective for their specialties, offer no versatility. The device disclosed in U.S. Pat. No. 4,209,180 (Bertorello), for instance, is made for large, heavy machining operations. Moreover, devices disclosed in U.S. Pat. No. 3,595,591 issued to Roland G. Koch et al. on Jul. 27, 1971 and U.S. Pat. No. 5,882,015 (McPherson) are floating toolholders, focused on machines that complete precise holes or threads.

One skilled in the art will appreciate that a device, like the one described in U.S. Pat. No. 4,583,432 issued to Michael W. Bricker on Apr. 22, 1986, for instance, involves the completion of a two-step process to set the alignment. In the first step, it is required to set the coarse adjustment and then set the precise adjustment by turning four fine adjustment screws in appropriate sequential rotation. Such process steps add complexity and time consuming adjustment to such an alignment operation.

Another device as described in PCT No. WO 99/10785 issued to Patrick Boland, et al. on Mar. 4, 1999, requires a CNC computer to align the work piece accurately.

Therefore, a need persists in the art for an eccentric toolholder that allows for radial offsets to be separated along two perpendicular axes, which may then be independently adjusted for precise alignment. The toolholder of the invention eliminates run-out and can be used for many different types of work pieces. Moreover, the toolholder is relatively compact and easily manufactured.

SUMMARY OF THE INVENTION

It is an object of the invention to provide a work piece holder device that maintains the work piece in alignment during rotary movements.

Another object of the invention is to provide a work piece holder that compensates for work piece run-out during operation.

Yet another object of the invention is to provide a method of aligning a work piece during rotary operations.

It is a feature of the invention that aligning members, structurally associated along the rotary axis of a rotary unit, holds a work piece aligned relative to the rotary axis in response to pivotal movements of the aligning members during operation.

To accomplish the aforementioned objects, advantages and features of the invention, there is provided, in one aspect of the invention, a method of alignably supporting a work piece for rotary movements. The method comprises the steps of: providing a work piece holder comprising a plurality of cooperating aligning members, wherein one of the plurality of cooperating aligning members has a bore opening for retaining the work piece for rotary movements about a rotary axis and wherein at least one of the plurality of cooperating aligning members is adapted to pivotable movements in one direction in response to work piece runout, and another of the plurality of cooperating aligning members being adapted to pivotable movements in another direction substantially orthorgonal to the one direction in response to another work piece runout; disposing the work piece securely in the bore opening for rotary movement; and adjustably aligning the work piece relative to the rotary axis in response to pivotable movements of the plurality of cooperating aligning members on the rotary axis.

The present invention has the following advantages:
In applications where concentric alignment is needed between a rotary axis and a cylindrical part, the disclosed device provides a means for quick and precise removal of radial runout by allowing eccentric adjustment along two perpendicular axes. The device is compact and lightweight consisting of only three small disks or plates, thus providing advantage for applications that have weight limitations and/or space constraints.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
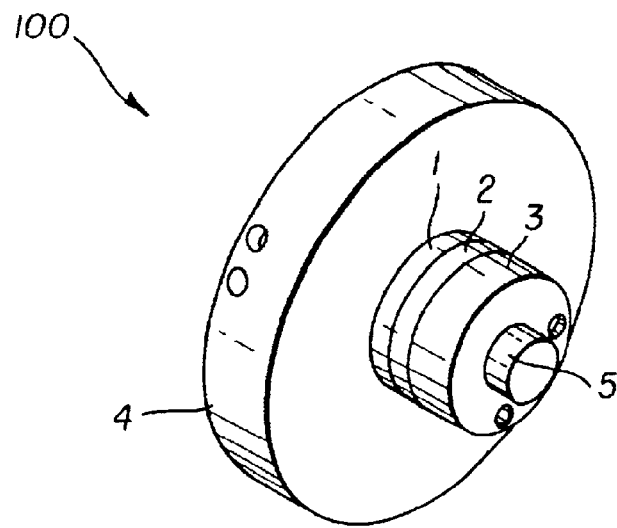
FIG. 1 is an isometric view of the assembled eccentric toolholder shown holding a cylindrical part and mounted to a circular disk representing the rotary axis of a machine tool.
Figure 2:
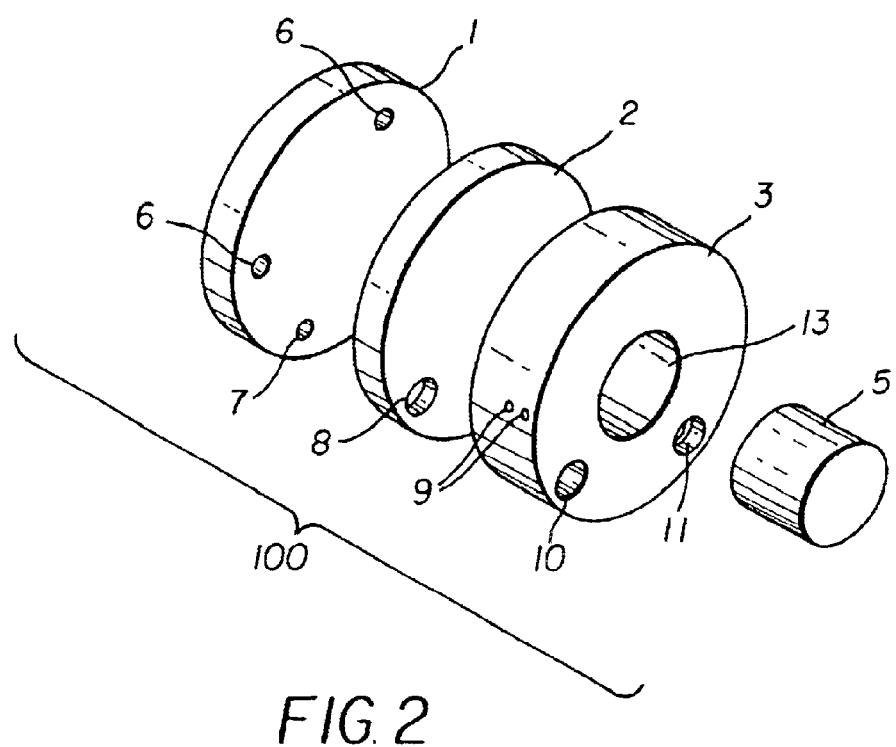
FIG. 2 is an isometric exploded view of the eccentric toolholder showing the three components of the invention along with a cylindrical part.

Turning now to the drawings, and in particular to FIGS. 1 and 2, the eccentric work piece holder 100 of the invention is illustrated. Broadly defined, eccentric work piece holder 100 is adaptable to a rotary unit (not shown). Rotary unit has a rotary axis 4 for rotating the work piece 5 during operation. A first aligning member 1 is fixedly mounted on the rotary axis 4 of the rotary unit. A second aligning member 2 is mounted for substantially X-directional pivotal movements along the rotary axis 4. The second aligning member 2 is arranged adjacent to the first aligning member 1. A third aligning member 3, being arranged nearest adjacent to the second aligning member 2, has a bore opening 13 for holding the work piece 5. Further, a third aligning member 3 is mounted for substantially Y-directional pivotal movement along the rotary axis 4. Rotary movement of the first-, second- and third aligning members 1, 2, 3, respectively, along the rotary axis 4 causes the work piece 5, secured in the third aligning member 3, to align relative to the rotary axis 4 in response to pivotable movements of the second aligning member 2 in the substantially X direction and pivotable movements of the third aligning member 3 in the substantially Y direction, thereby compensating for work piece runout in the X and Y directions.

Eccentric work piece holder 100 provides adjustment capability that allows radial runout between rotary axis 4 and work piece 5 to be removed via translations along two perpendicular axes, as described below. The present invention may be applied to work piece holding on turning machines to remove radial misalignment (runout) between the work piece 5 and the rotary axis 4. The operating principle behind the eccentric work piece holder 100 of the invention relies on the ability to move a work piece 5 along radial trajectories that lie in planes perpendicular to the cylindrical axis of the selected rotary mount. In reducing radial runout to within sub-micron dimensions, radial trajectories become nearly linear at the point of axis intersection. This phenomenon allows precise removal of radial runout, separating adjustment into two mutually perpendicular axes.

Referring again to FIGS. 1 and 2, more particularly, the eccentric toolholder 100, assembled and attached to the rotary axis 4 of a turning machine (not shown), is illustrated. The work piece 5 is fastened securely within the third aligning member 3. Moreover, third aligning member 3 is secured to the second aligning member 2. Second aligning member 2 is secured to the first aligning member 1. First aligning member 1 is mounted securely to rotary axis 4. According to FIG. 2, an exploded view of the eccentric toolholder 100 depicts preferred securing and adjustment features. Preferably, first aligning member 1 is secured to the rotary axis 4 via three fasteners using mounting holes 6. Further, second aligning member 2 pivots about mid-pivot point 7 through mid-pivot counter bore 8. Further, third aligning member 3 pivots about top-pivot point 12 (hidden in this view, shown in FIGS. 4 and 8–11) through top-pivot counter bore 11. Work piece 5 is positioned into third aligning member bore opening 13 and secured into third aligning member 3 via several fasteners acting through radial tapped holes 9. Fasteners are not shown for clarity.

Figure 3:
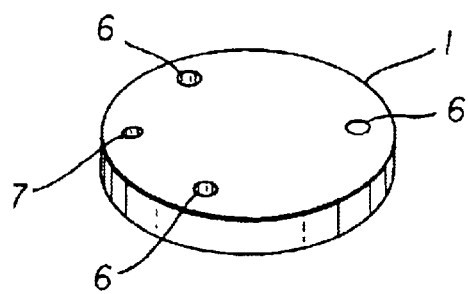
FIG. 3 is an illustration of the first disk of the assembly.
Figure 4:
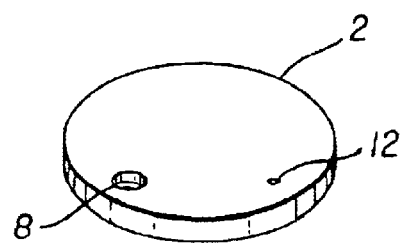
FIG. 4 is an illustration of the second disk of the assembly.
Figure 5:
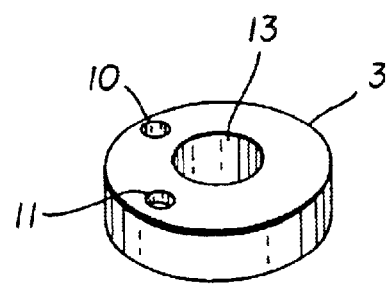
FIG. 5 is an illustration of the third disk of the assembly.

Referring to FIGS. 3, 4, and 5, an unobstructed view of each aligning member 1, 2, 3 is illustrated. According to FIG. 3, first aligning member 1, is stationary and consists of three mounting holes 6 for mounting to the rotary axis 4 of a machine tool. This first aligning member 1 is also provided with a mid-pivot point 7 for the first point of rotation of the second aligning member 2. According to FIG. 4, second aligning member 2 has two holes, one clearance mid-pivot counter bore 8 and one tapped top-pivot point 12 offset by substantially 90 degrees. The mid-pivot counter bore 8 aligns with the mid-pivot point 7 in the first aligning member 1 and is fitted with a fastening member (not shown) that allows rotation of the second aligning member 2 when loosened. According to FIG. 5, the third aligning member 3 has a centrally located opening 13 to hold a cylindrical work piece 5. In addition, the third aligning member 3 contains two holes, one clearance top-pivot counter bore 11 and one clearance mid-pivot adjustment hole 10 offset by 90 degrees. The top-pivot counter bore 11 aligns with the tapped top-pivot point 12 in the second aligning member 2 and is fitted with a fastening member (not shown) that allows rotation of the third aligning member 3 when loosened. The mid-pivot adjustment hole 10 allows access to the fastening member (not shown) in the second aligning member 2.

Figure 6:
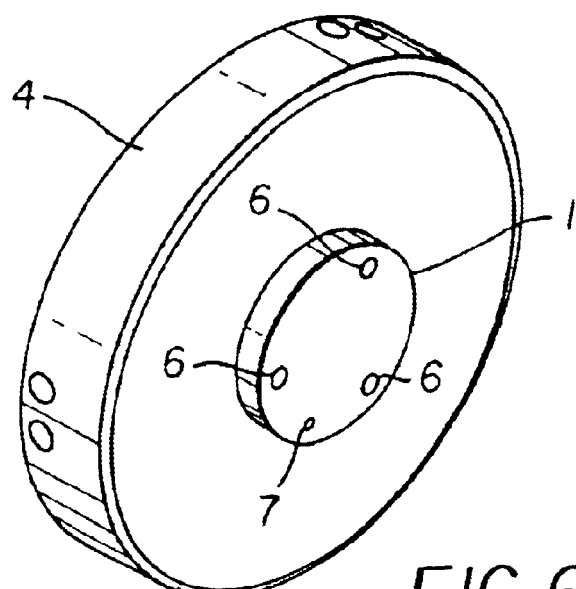
FIG. 6 is an isometric view of the first disk mounted to a circular disk representing the rotary axis of a machine tool.
Figure 7:
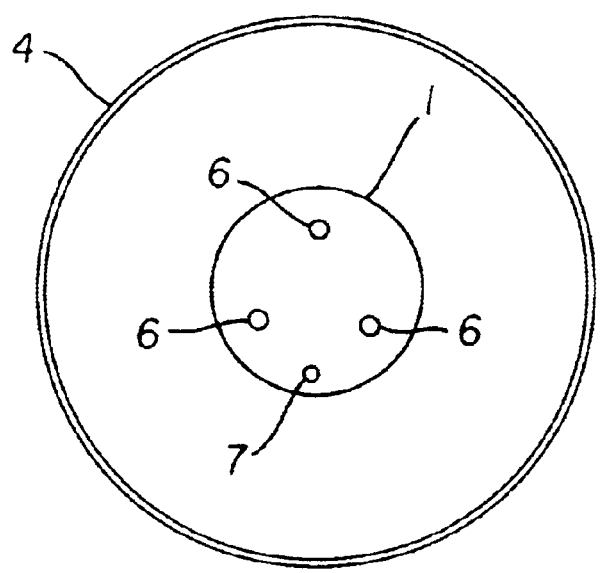
FIG. 7 is a front view of the first disk mounted to a circular disk representing the rotary axis of a machine tool.
Figure 9:
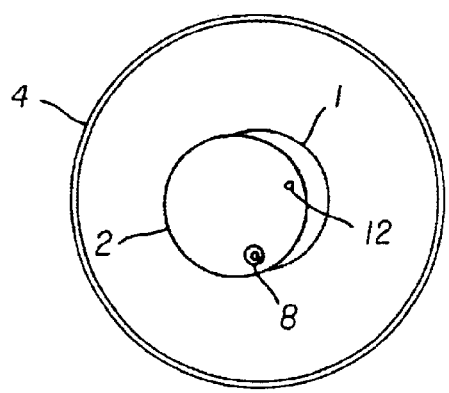
FIG. 9 is a front view of the assembly consisting of the first and second disks mounted to a circular disk representing the rotary axis of a machine tool, with the second disk rotated slightly to the left of the first disk's center.

Referring to FIGS. 6 and 7, in operation, the first aligning member 1 is aligned to be concentric with the rotary axis 4 to which it is mounted. Both the second aligning member 2 and third aligning member 3 are then attached with their respective fastening members—loosely aligned to be concentric with the first aligning member 1. A cylindrical work piece 5 is then mounted rigidly in the third aligning member 3 using any manner of holding, including clamping, on the body diameter with set screws driven normal to the cylindrical surface through radial tapped holes 9 in the third aligning member 3. Alignment is pursued while rotating the mounted assembly in the machine tool with an indicator measuring run out on the cylindrical work piece 5 held. Run out is first eliminated in a direction aligned with the single degree-of-freedom (dof) dictated by the movement of the second aligning member 2. As depicted in FIG. 9, the first degree-of-freedom is shown to be along the horizontal plane—allowing movement from side to side.

Figure 8:
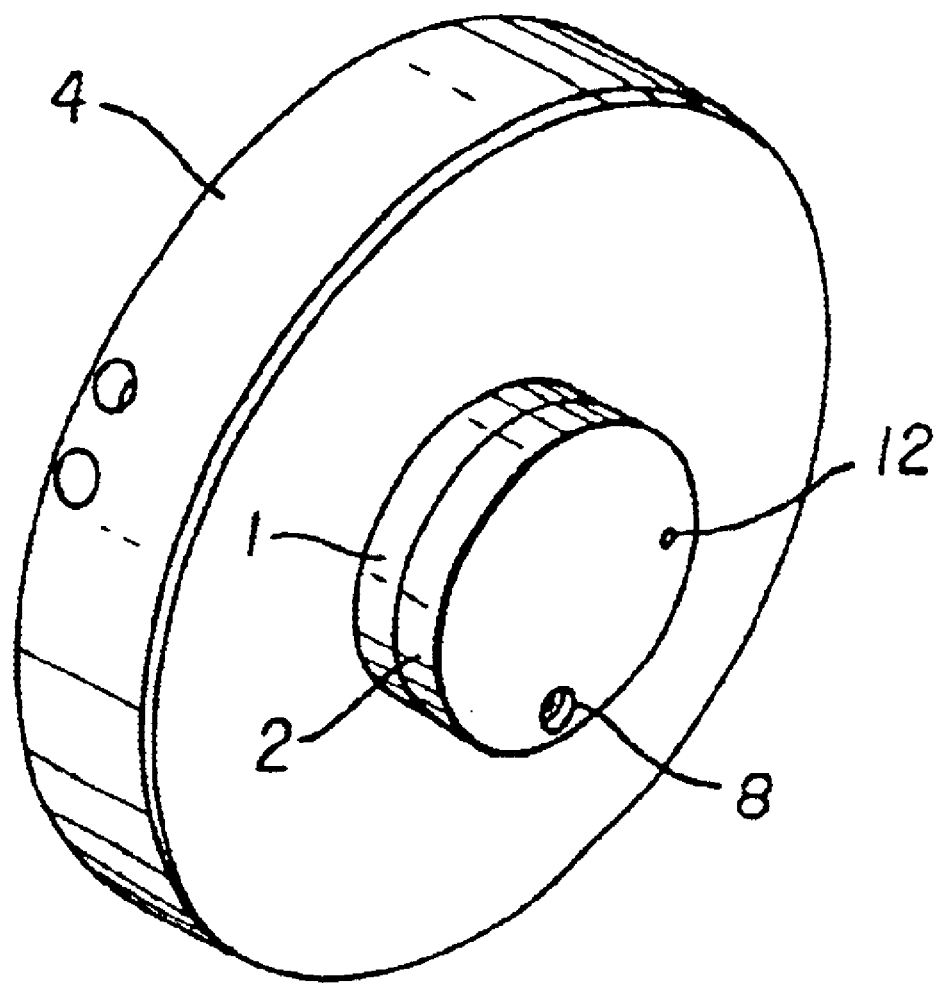
FIG. 8 is an isometric view of the second disk mounted to the first disk, which is mounted to a circular disk representing the rotary axis of a machine tool.

Referring to FIG. 8, the attachment of second aligning member 2 to first aligning member 1 is illustrated. The preferred attachment is accomplished via a fastener (not shown) that passes through mid-pivot counter bore 8 in second aligning member 2 and the mid pivot point 7 of first aligning member 1.

Figure 10:
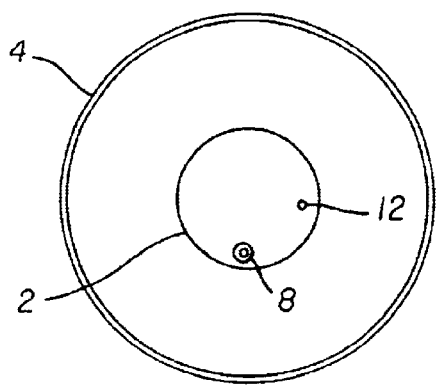
FIG. 10 is a front view of the assembly consisting of the first and second disks mounted to a circular disk representing the rotary axis of a machine tool, with the second disk concentrically aligned with the first disk.
Figure 11:
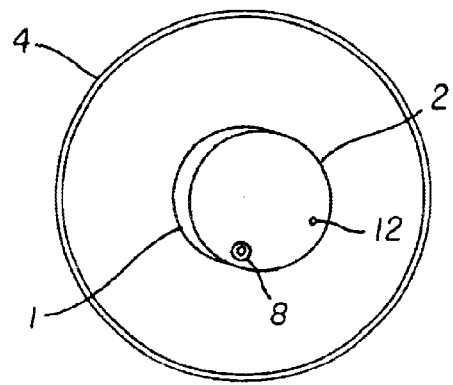
FIG. 11 is a front view of the assembly consisting of the first and second disks mounted to a circular disk representing the rotary axis of a machine tool, with the second disk rotated slightly to the right of the first disk's center.

Referring to FIGS. 9, 10, and 11, various locations are illustrated of the second aligning member 2 while rotating about mid-pivot counter bore 8, providing a representation of motion indicating side-to-side movement. Using half the indicator measurement of total run out for the cylindrical work piece 5 in the horizontal plane, the second aligning member 2 would be adjusted by loosening the fastener at mid-pivot counter bore 8 and then moving the second aligning member 2 in the proper direction by this offset amount and refastening. The refastening step negates the run-out in this first degree-of-freedom direction. Run out is then eliminated in a direction perpendicular to the first degree-of-freedom, dictated by the third aligning member 3. According to FIG. 13, the second degree-of-freedom is shown to be along the vertical plane allowing movement up-and-down.

Figure 12:
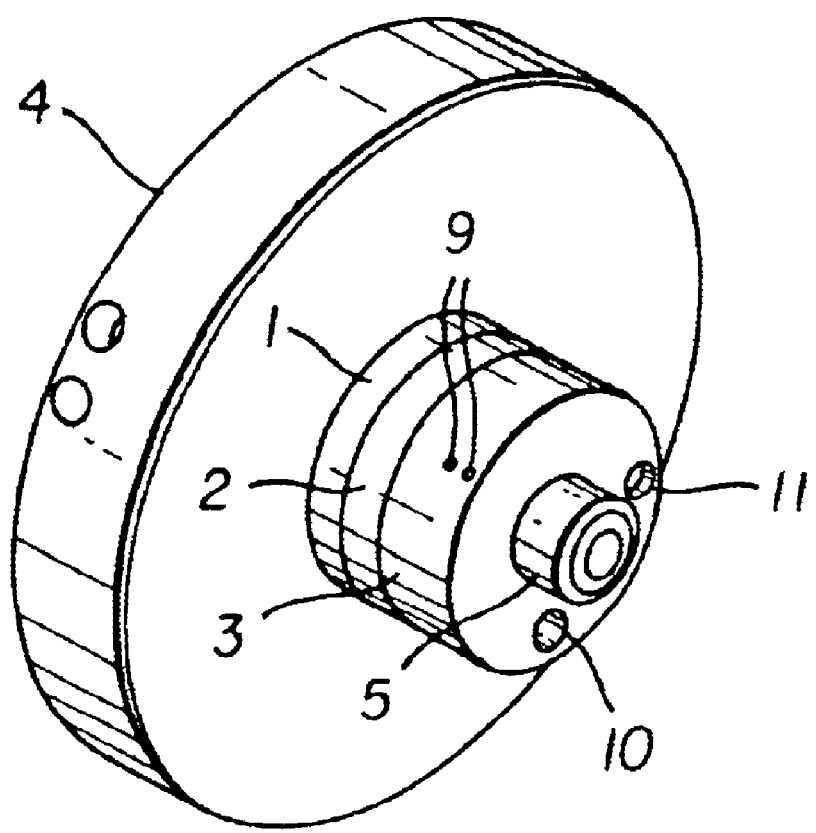
FIG. 12 is an isometric view of the third disk mounted to the assembly of the first disk and second disk, which is mounted to a circular disk representing the rotary axis of a machine tool.

Referring to FIG. 12, the attachment of third aligning member 3 which contains work piece 5 to second aligning member 2 is illustrated. The preferred attachment is accomplished via a fastener (not shown) that passes through top-pivot counter bore 11 in third aligning member 3 and the top pivot point 12 of second aligning member 2.

Figure 13:
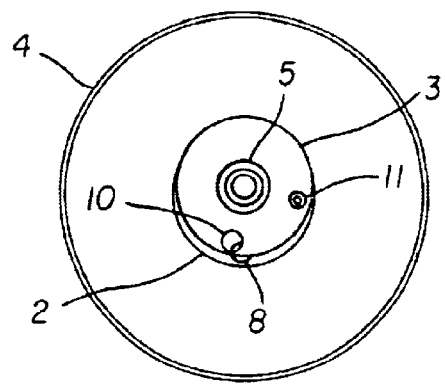
FIG. 13 is a front view of the assembly consisting of the first, second, and third disks mounted to a circular disk representing the rotary axis of a machine tool, with the third disk rotated slightly above the second disk's center.
Figure 14:
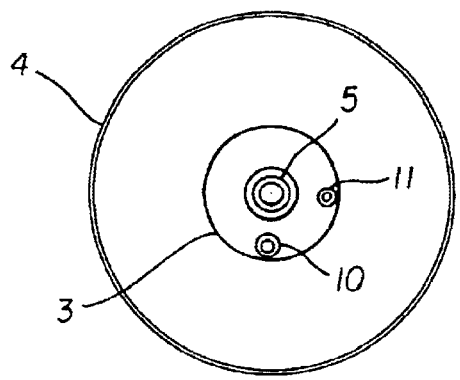
FIG. 14 is a front view of the assembly consisting of the first, second, and third disks mounted to a circular disk representing the rotary axis of a machine tool, with the third disk concentrically aligned with the first and second disks.
Figure 15:
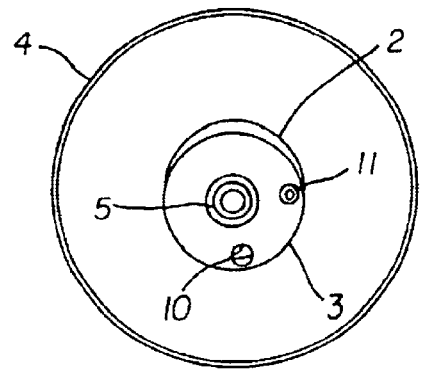
FIG. 15 is a front view of the assembly consisting of the first, second, and third disks mounted to a circular disk representing the rotary axis of a machine tool, with the third disk rotated slightly below the second disk's center.

Referring to FIGS. 13, 14, and 15, various locations of the third aligning member 3 while rotating about top-pivot counter bore 11 are illustrated. This provides the pivotal movement of third aligning member 3 along the vertical axis. Similar to the first degree-of-freedom adjustment, using half the indicator measurement of total run out for the cylindrical work piece 5 in the vertical plane, the third aligning member 3 would be adjusted by loosening the fastener at top-pivot counter bore 11 and moving the third aligning member 3 in the proper direction by this offset amount and refastening, negating the run-out in this second degree-of-freedom direction. Once both first and second degree-of-freedom adjustments are made, run out is eliminated. This device allows elimination of run-out between two cylindrical parts.

The invention has been described with reference to a preferred embodiment. However, a person of ordinary skill in the art can effect variations and modifications without departing from the scope of the invention.

PARTS LIST 1 first aligning member
2 second aligning member
3 third aligning member
4 rotary axis
5 work piece
6 mounting holes
7 mid-pivot point
8 mid-pivot counter bore
9 radial tapped holes
10 mid-pivot adjustment hole
11 top-pivot counter bore
12 top-pivot point
13 third aligning member bore opening
100 eccentric work piece holder

What is claimed is:

1. A method of alignably supporting a work piece for rotary movements, said method comprising the steps of:

providing a work piece holder comprising a plurality of cooperating aligning members, wherein one of said plurality of cooperating aligning members has a bore opening for retaining said work piece for rotary movements about a rotary axis; and wherein at least one of said plurality of cooperating aligning members is adapted to pivotable movements in one direction in response to work piece runout, and another of said plurality of cooperating aligning members being adapted to pivotable movements in another direction substantially orthorgonal to said one direction in response to another work piece runout;

disposing said work piece securely in said bore opening for rotary movement; and, adjustably aligning said work piece relative to said rotary axis in response to pivotable movements of said plurality of cooperating aligning members on said rotary axis.

2. The method recited in claim 1 wherein each one of said cooperating aligning members is substantially circular shaped.

3. The method recited in claim 1 wherein said step of providing a work piece holder further includes the step of fastening together said plurality of cooperating aligning members with screw fasteners.

4. The method recited in claim 3 wherein said step of adjustably aligning said work piece includes the steps of:

(a) loosening said screw fasteners;

(b) moving each one of the plurality of cooperating aligning members to a position along said rotary axis that compensates for work piece run out; and, (c) refastening each one of said plurality of cooperating aligning members.

* * * * *